(12) United States Patent
O'Donnell

(10) Patent No.: US 8,035,641 B1
(45) Date of Patent: Oct. 11, 2011

(54) FAST DEPTH OF FIELD SIMULATION

(75) Inventor: Daniel O'Donnell, Port Townsend, WA (US)

(73) Assignee: Adobe Systems Incorporated, San Jose, CA (US)

( * ) Notice: Subject to any disclaimer, the term of this patent is extended or adjusted under 35 U.S.C. 154(b) by 969 days.

(21) Appl. No.: 11/946,704

(22) Filed: Nov. 28, 2007

(51) Int. Cl.
*G06T 15/00* (2006.01)

(52) U.S. Cl. ........ 345/420; 345/419; 345/426; 345/440; 345/522; 345/634

(58) Field of Classification Search .................. 345/419, 345/420, 423, 426, 427, 581, 440, 522, 629, 345/634
See application file for complete search history.

(56) References Cited

U.S. PATENT DOCUMENTS

| | | | |
|---|---|---|---|
| 5,579,454 A | 11/1996 | Billyard et al. | |
| 5,675,773 A | 10/1997 | Devic | |
| 5,764,795 A | 6/1998 | Takeo et al. | |
| 5,881,211 A | 3/1999 | Matsumura | |
| 5,943,058 A | 8/1999 | Nagy | |
| 6,016,150 A | 1/2000 | Lengyel et al. | |
| 6,028,583 A | 2/2000 | Hamburg | |
| 6,324,347 B1 | 11/2001 | Bacs et al. | |
| 6,426,755 B1 * | 7/2002 | Deering | 345/581 |
| 6,466,210 B1 | 10/2002 | Carlsen et al. | |
| 6,717,567 B1 | 4/2004 | Bowden, III et al. | |
| 6,717,576 B1 | 4/2004 | Duluk et al. | |
| 6,809,745 B1 | 10/2004 | O'Donnell et al. | |
| 6,903,741 B2 | 6/2005 | Corbetta | |
| 7,068,275 B2 | 6/2006 | Nakamura et al. | |
| 7,116,359 B2 | 10/2006 | Kitamura | |
| 7,167,181 B2 | 1/2007 | Duluk et al. | |
| 7,236,169 B2 | 6/2007 | Barone et al. | |
| 7,324,116 B2 | 1/2008 | Boyd et al. | |
| 7,453,459 B2 * | 11/2008 | Shekter | 345/423 |
| 7,463,261 B1 * | 12/2008 | O'Donnell | 345/427 |
| 7,598,952 B1 * | 10/2009 | O'Donnell | 345/426 |
| 7,825,933 B1 * | 11/2010 | Kilgard et al. | 345/522 |
| 2002/0003541 A1 | 1/2002 | Boyd et al. | |
| 2005/0031199 A1 | 2/2005 | Ben-Chorin et al. | |
| 2005/0271302 A1 | 12/2005 | Khamene et al. | |
| 2006/0282604 A1 | 12/2006 | Temkine et al. | |

OTHER PUBLICATIONS

Michael Potmesil and Indranil Chakravarty, "Synthetic Image Generation with a Lens and Aperture Camera Model," *ACM Transactions on Graphics*, Apr. 1982, pp. 85-108, vol. 1, No. 2, ACM, New York.

Michael Kass, Aaron Lefohn, and John Owens, "Interactive Depth of Field Using Simulated Diffusion on a GPU," Pixar Technical Memo #06-01, Jan. 2006, Pixar Animation Studios, http://graphics.pixar.com/DepthOfField/paper.pdf.

(Continued)

*Primary Examiner* — Phu Nguyen

(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for rendering a scene with a simulated depth of field blur. In one embodiment, the scene comprises a plurality of polygons, each polygon comprises a respective plurality of vertices, and each of the vertices has a respective depth. A respective blur radius may be determined for each vertex of each polygon as a function of the depth of the vertex. A respective blur radius may be determined for each pixel in each polygon based on the blur radii for the vertices of the polygon. Each pixel in each polygon may be rendered using the respective blur radius determined for the pixel.

19 Claims, 6 Drawing Sheets

OTHER PUBLICATIONS

SIG, "OpenGL(r) Extension Registry", http://oss.sgi.com/projects/ogl-sample/registry/, (Coppyright 1993-2003), Web Page.

Stewart, Nigel, "Real-Time Rendering and 3D Games Programming", 'COSC1224/1226, RMIT School of Computer Science and Information Technology', (Sep. 25, 2003) 1-40.

Iverson, Jason, "Tutorials", http://www.odforce.net/tips/shaderwriting2.php, 1-3, Mar. 2011.

Kniss, Joe, et al., "Interactive Volume Rendering Using Multi-Dimensional Transfer Functions and Direct Manipulation Widgets", 'Scientific Computing and Imaging Institute, School of Computing, University of Utah', 8 pgs, 2002.

"Game Programming Gems 5", 'Game Programming Gems 5, Charles River Media, Inc.', (2005), 70 pgs.

Blinn, J F., "Compositing. 1. Theory", 'IEEE Computer Graphics & Applications', 14(5), (Sep. 1994), 83-87.

Abram, Gregory D., et al. "Building block shaders", 'Proceedings of the 17th Annual Conference on Computer Graphics and Interactive Techniques', (1990), 283-288.

Porter, Thomas, "Compositing digital images", 'International Conference on Computer Graphics and Interactive Techniques, Proceedings of the 11th annual conference on Computer graphics and interactive techniques', (1984), 253-259.

Parent, Rick, "Chapter 3 Display Considerations", http://www.oopweb.com/Graphics/Documents/companim/Volume/Dspl... (1998), 1-4.

McCool, Michael, "Shader metaprogramming", 'Proceedings of the ACM SIGGRAPH/EUROGRAPHICS conference on Graphics hardware', Revised Paper,(Sep. 1-2, 2002), pp. 1-2.

McCool, Michael et al., "Shadwer Algebra", ACM Transactions on Graphics (TOG), Special Issue: Proceedings of the 2004 SIGGRAPH Conference, 23(3), (2004), 787-795.

Guenter, Brian, et al., "Specializing shaders", 'Proceedings of the 22nd Annual Conference on Computer Graphics and Interactive Techniques', (1995),343-350.

Fuchs, Henry, et al., "Predetermining Visibility Priority in 3-D Scenes", 'Computer Graphics, SIGGRAPH '79', 13(2), (Aug. 1979), 175-181.

Fuchs, Henry, et al., On Visible Surface Generation by A Priori Tree Structures, 'Computer Graphics SIGGRAPH '80' (1980), 124-133.

Fuchs, Henry, et al., "Near real-time shaded display of rigid objects", 'Proceedings of the 10th Annual Conference on Computer Graphics and Interactive Techniques', (1983),65-72.

Everitt, Cass, "Interactive Order-Independent Transparency", http://developer.nvidia.com/object/ Interactive_Order_Transparency.html, (May 15, 2001), 1-11.

Elinas, Patelis, "Real-time rendering of 3D clouds", 'Journal of Graphics Tools', 5(4), (Nov. 2000), 33-45.

Dachille, Frank, "Architectures for Realistic Volume Imaging", 'Preliminary Exam, SUNY at Stony Brook', (1999) 1-63.

Crow, Franklin C., "Shadow algorithms for computer graphics", 'International Conference on Computer Graphics and Interactive Techniques, Proceedings of the 4th annual conference on Computer graphics and interactive techniques', (1977), 242-248.

Chin, Norman, et. al., "Near real-time shadow generation using BSP trees", 'Proceedings of the 16th Annual Conference on Computer Graphics and Interactive Techniques', (Jul. 1989), 99-106.

Callahan, Steven P., "Hardware-Assisted Visibility Sorting for Unstructured Volume Rendering", 'SCI Institute Technical Report.', The University of Utah,(Jun. 14, 2004),1-9.

BSP-FAQ, "Binary Space Partitioning Trees FAQ", http://www.faqs.org/faqs/graphics/bsptree-faq/, (Sep. 26, 1995), Web Page.

Blinn, J F., "Compositing, part 2: practice", 'IEEE Computer Graphics and Application', 14(6), (Nov. 1996), 78-82.

Bardens, Ben, "After Effects Using Track Mattes", 'Editors Guild Magazine', Reprinted from The Editors Guild Magazine vol. 24, No. 2-Mar./Apr. 2003, 1-4.

Berger, Christopher, "A Flexible Framework for Hardwar-Accelerated high-Quality vol. Rendering", 'Technical Report TR-VRVis-2003-001, VRVis Research Center', (2003),1-10.

Birn, Jeremy, "Render Passes, Layers, and 3D Compositing", '3d Compositing at 3rRender.com', http://www.3drender.com/light/compositing/, From the book Digital Lighting & Rendering, (2000), 1-4.

"Game Programming Gems 5", 'Game Programming Gems 5, Charles River Media, Inc.', (2005), 70 pgs.

"GPUGems2-Programming Techniques for High-Preformance Graphics and General-Purpose Computation", 'GPUGems 2-Programming Techniques for High-Preformance Graphics and General-Purpose Computation, Addison-Wesley', (2005), 46 pgs.

Adobe, "Chapter 7-Transparency", 'PDF Reference, Fifth Edition, Version 1.6', http:partners.adobe.com/public/developer/pdf/index_Reference.html#5,(2004), 483-545.

Adobe, "Effects, part 2", 'Adobe After Effects 5.0', 1-31, 2001.

Adobe, "Effects part 3", 'Adobe After Effects 5.0', 1-20, 2001.

Adobe. "Effects, part 4", 'Adobe After Effects 5.0', 1-32, 2001.

Carpenter, Loren, "The A -buffer, an antialiased hidden surface method", 'International Conference on Computer Graphics and Interactive Techniques, Proceedings of the 11th annual conference on Computer graphics and Interactive techniques', (1984), 103-108.

Chartrand, Gary, et al., "Applied and algorithmic graph theory", 'New York: McGraw-Hill', (1993), 30 pgs.

Chrysanthou, Y, et al., "Computing Dynamic Changes to BSP Trees", 'Eurographics '92 Proceedings', 11(3), (Sep. 1992), 1 page.

Foley, James D., "List-Priority Algorithms", '(BOOK)-Computer Graphics:Principles and Practice, 2nd Edition', (1990), 672-680.

Foley, J. D., "List-Priority Algorithms", Book-Computer Graphics Principles and Practice, 2nd Edition in C, (1997),672-680.

Foley, J. D., et al., The Systems Programming Series, 'Computer Graphics Principles and Practice, 2nd Edition in C', Second Edition in C,(1997), 203,207,208,835.

McCool, Michael, "Metaprogramming GPUs with Sh", Wellesley, MA: A K Peters, Book xvii(2004), 60 pgs.

Rost, Randy,I "OpenGLA(r) Shading Language", 'Reading, MA: Addison-Wesley', (Feb. 20, 2004), 47 pgs.

Meyer, T., et al., "Creating Motion Graphics with after effects", 'vol. 1: The Essentials, 3rd Edition, CMP Books', (2000) 4 pages.

Thomas, Spencer W., "Decomposing a Matrix Into Slmple Transformations", 'In: Graphics Gems II by James Arvo', Boston: Academic Press, (1991),320-323.

Adobe, "Adobe After Effects", 'Adobe After Effects 5.5 Effect PDFs', Table of effects in after effects 5.5, 1-5, Feb. 2003.

Adobe, "Effects, part 1", 'Adobe After Effects 5.0', 1-45, 2001.

Adobe, "Effects, part 5", 'Adobe After Effects 5.0', 1-26, 2001.

Adobe, "Effects, part 6", 'Adobe After Effects 5.0', 1-29, 2001.

Adobe, "Effects, part 7", 'Adobe After Effects 5.0', 1-13, 2001.

Franklin, Curt, "How 3-D Graphics Work", http://computer.howstuffworks.com/3dgraphics.htm/printable, 1-11, Apr. 2011.

"GPUGems-Programming Techniques, Tips, and Tricks for Real-Time Graphics", 'GPUGems-Programming Techniques, Tips, and Tricks for Real-Time Graphics', Addison-Wesley, 40pgs, May 2004.

Meyer, Trish, et al., "Creating Motion Graphics with after effects", 'vol. 1: The Essentials, 3rd Edition, CMP Books', 104 pgs, 2000/2002.

* cited by examiner

FAST DEPTH OF FIELD SIMULATION

BACKGROUND

1. Field of the Invention

The present invention is directed to computer systems; and more particularly, it is directed to the simulation of depth of field effects using computer systems.

2. Description of the Related Art

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

A GPU may include various built-in and configurable structures for rendering digital images to an imaging device. Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, Bézier curves, text characters, etc.) may be based upon mathematical equations to represent parts of vector graphics data in digital images. The geometric objects may typically be located in two-dimensional or three-dimensional space. An object in three-dimensional space may lie on a plane referred to as a layer. To render vector graphics on raster-based imaging devices (e.g., most display devices and printers), the geometric objects are typically converted to raster graphics data in a process called rasterization.

In rendering digital images, the use of depth of field effects may be desired. In traditional photography, a depth of field blur may result from the inability of a camera lens to keep all the elements of the photograph in focus simultaneously. Consequently, elements that are out of focus may be blurred. It may be desirable to simulate such a depth of field effect in a digital image.

In one prior approach to rendering digital images using a depth of field blur, scene information is gathered from several points on the lens of the camera. The scene information is blended during the rendering of a pixel in the image to simulate a depth of field blur. For example, a ray-tracing renderer may use this approach to sample the incoming light from various points on the lens. However, many rays must typically be cast to generate an accurate depth of field blur, thereby unduly increasing the rendering time.

In another prior approach to rendering digital images using a depth of field blur, a renderer applies the depth of field blur to the rendered image as a post process using the depth information stored in the image. For example, a scanline renderer may use this approach by rendering with a pinhole camera and blurring the resulting image based on the distance of each pixel from the camera. However, unless the blur is diffused up to a depth boundary, the blurring may inappropriately mix colors at various depths in the image. Additionally, by requiring an additional process after the image has been rendered, this approach may also unduly increase the rendering time.

SUMMARY

Various embodiments of systems, methods, and computer-readable storage media for simulating a depth of field effect in a rendered scene are disclosed. In one embodiment, a scene may comprise a plurality of polygons, each polygon may comprise a respective plurality of vertices, and each of the vertices may have a respective depth. The polygons may be sorted by depth. A blur radius may be determined for each vertex of each polygon as a function of the depth of the vertex. A blur radius may be determined for each pixel in each polygon based on the blur radii for the vertices of the polygon. In one embodiment, the blur radius may be determined for each pixel through interpolation of the blur radii of the vertices of the polygon. Each pixel in each polygon may be rendered using the respective blur radius determined for the pixel. The rendered scene may then be displayed on a display device.

In one embodiment, each vertex of each polygon may be expanded (i.e., move out) from a center of the polygon by the respective blur radius of the vertex. Similarly, each texture coordinate for each vertex of each polygon may be expanded from the center of the polygon by the respective blur radius of the vertex. In one embodiment, the blur radii may be recalculated for each expanded vertex. Polygons that intersect or mutually obscure one another may be split for rendering using the painter's algorithm.

The polygons may be rendered in depth order, from furthest to nearest. In rendering each pixel in each polygon, texture values within the blur radius determined for the pixel may be sampled. The sampled texture values may be averaged to generate a color for the pixel. The pixels in each polygon may be written to an image buffer.

Figure 1:
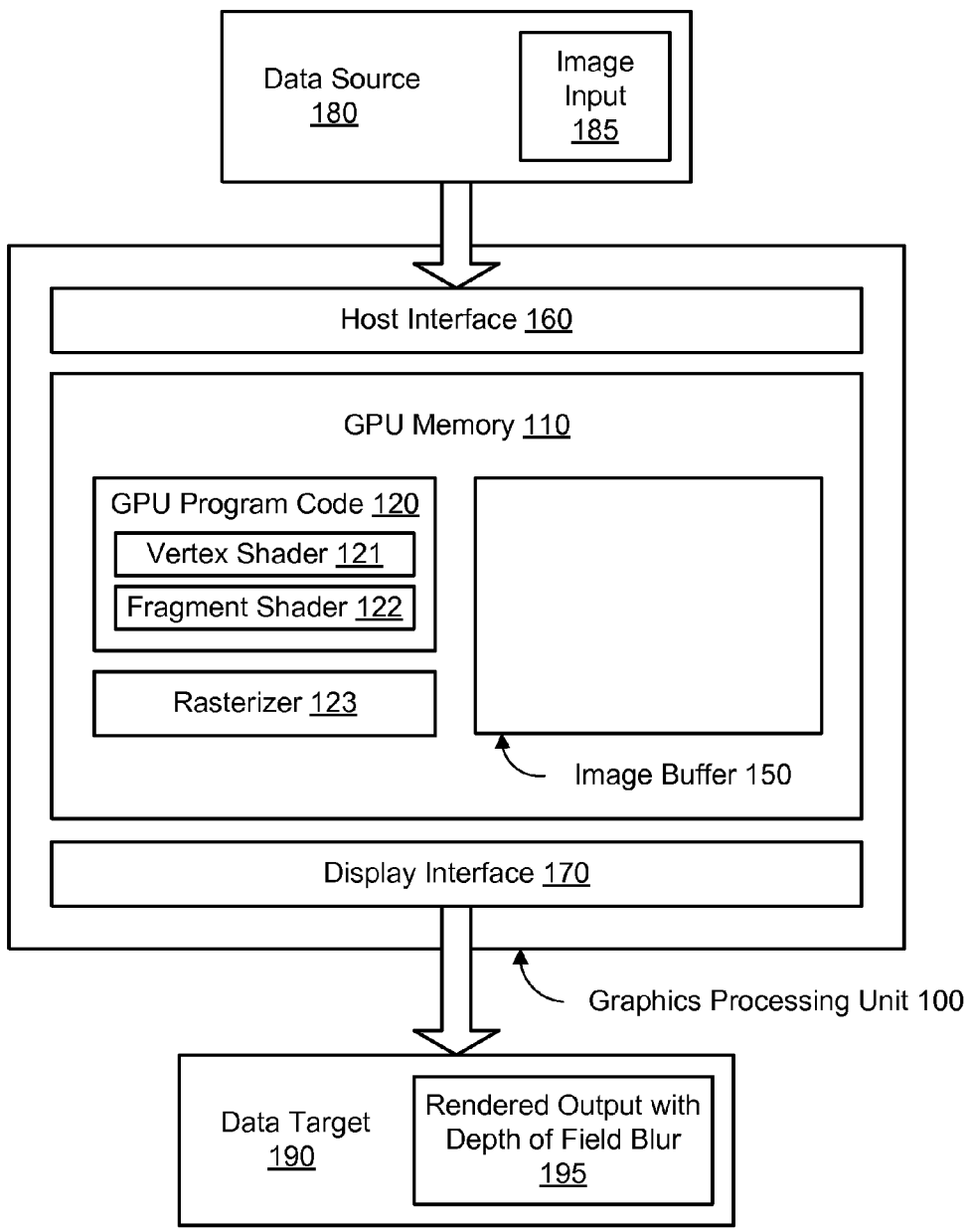
FIG. 1 is a diagram illustrating one embodiment of a graphics processing unit (GPU) configured for rendering images with a depth of field blur.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 6:
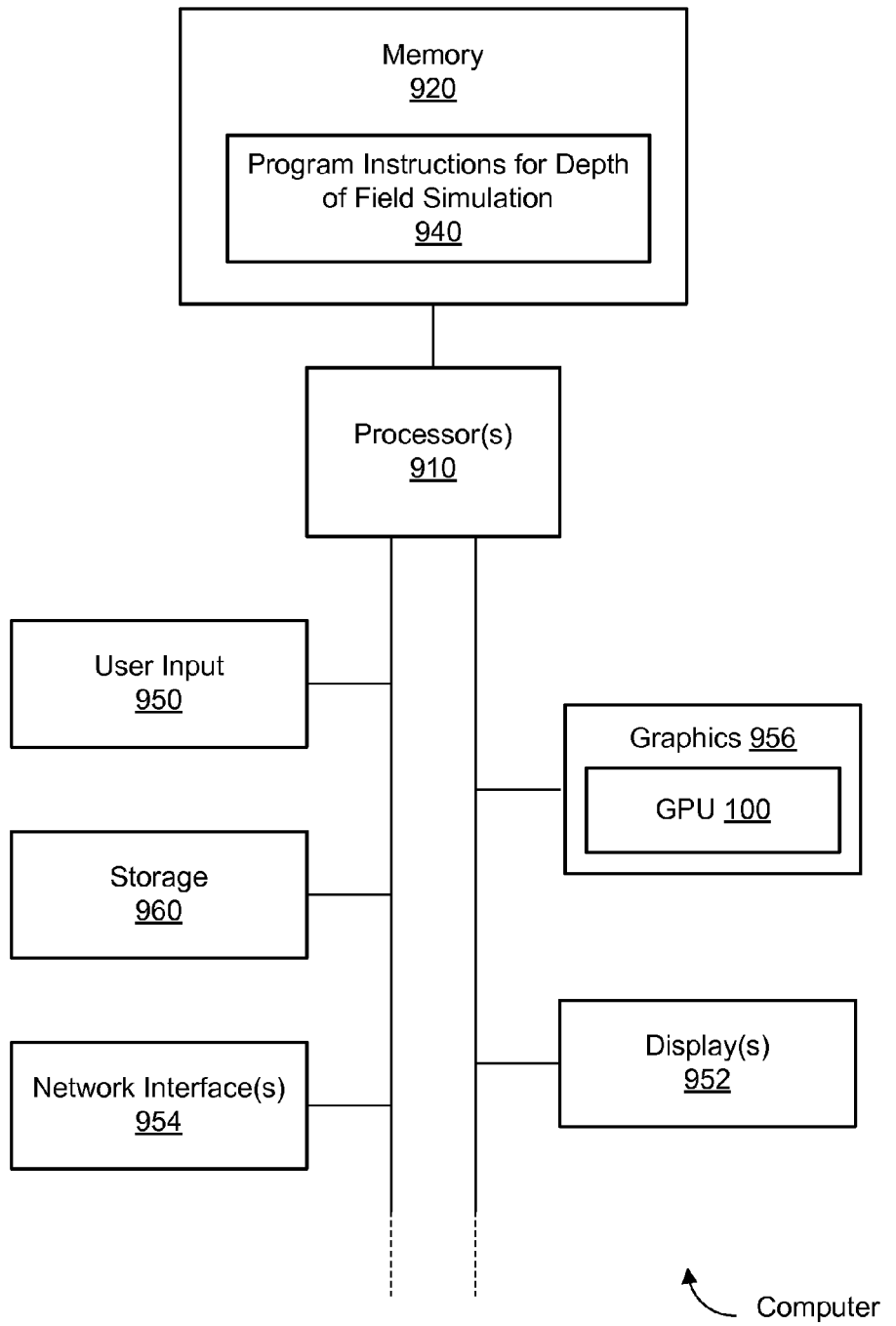
FIG. 6 is a diagram illustrating constituent elements of a computer system that is configured to implement embodiments of the system and method for rendering images with a depth of field blur.

Using embodiments of the systems and methods described herein, a depth of field blur in a digital image may be simulated efficiently using a graphics processing unit (GPU). FIG. 1 is a diagram illustrating one embodiment of a graphics processing unit (GPU) configured for rendering images with a depth of field blur. The GPU 100, also referred to herein as a graphics processor, may comprise a dedicated graphics rendering device associated with a computer system. An example of a suitable computer system 900 for use with a GPU is illustrated in FIG. 6. Turning back to FIG. 1, the GPU 100 may include numerous specialized components configured to optimize the speed of rendering graphics output. For example, the GPU 100 may include specialized components for rendering three-dimensional models, for applying textures to surfaces, etc. For the sake of illustration, however, only a limited selection of components is shown in the example GPU 100 of FIG. 1. It is contemplated that GPU architectures other than the example architecture of FIG. 1 may be suitable for implementing the techniques described herein. The GPU 100 may implement one or more application programmer interfaces (APIs) that permit programmers to invoke the functionality of the GPU. Suitable GPUs may be commercially available from vendors such as NVIDIA Corporation, ATI Technologies, and others.

The GPU 100 may include a host interface 160 configured to communicate with a data source 180 (e.g., a communications bus and/or processor(s) 910 of a host computer system 900 or the host system itself). For example, the data source 180 may provide image input data 185 (e.g., a scene comprising one or more geometric objects in three-dimensional space) and/or executable program code to the GPU 100. In some embodiments, the host interface 160 may permit the movement of data in both directions between the GPU 100 and the data source 180. The GPU 100 may also include a display interface 170 for providing output data to a data target 190. For example, the data target 190 may comprise a display device 952, and the GPU 100 (along with other graphics components and/or interfaces 956) may "drive" the display 952 by providing graphics data at a particular rate from a screen buffer (e.g., the image buffer 150).

In one embodiment, the GPU 100 may include internal memory 110. The GPU memory 110, also referred to herein as "video memory" or "VRAM," may comprise random-access memory (RAM) which is accessible to other GPU components. As will be described in greater detail below, the GPU memory 110 may be used in some embodiments to store various types of data and instructions such as input data, output data, intermediate data, program instructions for performing various tasks, etc. In one embodiment, the GPU 100 may also be configured to access memory 920 of a host computer system 900 via the host interface 160.

In one embodiment, program instructions 940 may be stored in the memory 920 of the host computer system 900 and executed by the host computer system 900 to generate rendered image output 195 based on the image input 185. The image input 185 may include a scene comprising one or more geometric objects in three-dimensional space (e.g., as vertices and associated data in a tessellation). In one embodiment, the rendered image output 195 may include a simulated depth of field blur that is generated using the GPU 100 according to the techniques described herein.

In one embodiment, the GPU 100 may include GPU program code 120 that is executable by the GPU 100 to perform aspects of the techniques discussed herein. For example, the geometric objects in the image input 185 may be rasterized to pixels by a rasterizer 123 during a rendering process including execution of the GPU program code 120 on the GPU 100. Elements of the GPU program code 120 may be provided to the GPU 100 by a host computer system (e.g., the data source 180) and/or native to the GPU 100. In one embodiment, the GPU program code 120 may comprise a vertex shader 121. A vertex shader 121 comprises program instructions that are executable by the GPU 100 to determine properties (e.g., position) of a particular vertex. A vertex shader may expect input such as uniform variables (e.g., constant values for each invocation of the vertex shader) and vertex attributes (e.g., per-vertex data). In one embodiment, the GPU program code 120 may comprise a fragment shader 122. The fragment shader 122 may also be referred to as a pixel shader 122. The fragment shader 122 comprises program instructions that are executable by the GPU 100 to determine properties (e.g., color) of a particular pixel. A fragment shader may expect input such as uniform variables (e.g., constant values for each invocation of the fragment shader) and pixel attributes (e.g., per-pixel data). In generating the rendered image output 195, both the vertex shader 121 and the fragment shader 122 may be executed at various points in the graphics pipeline.

The GPU memory 100 may comprise one or more buffers, and each buffer may comprise a two-dimensional array of pixel data (e.g., color values) and/or pixel metadata (e.g., depth values, stencil values, etc.). As illustrated in FIG. 1, for example, the GPU memory 110 may comprise an image buffer 150. The image buffer 150 may store intermediate or final pixel values generated in the rendering process. In one embodiment, the image buffer 150 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In another embodiment, the image buffer 150 may comprise a multi-sampling buffer usable for automatic anti-aliasing.

Figure 2A:
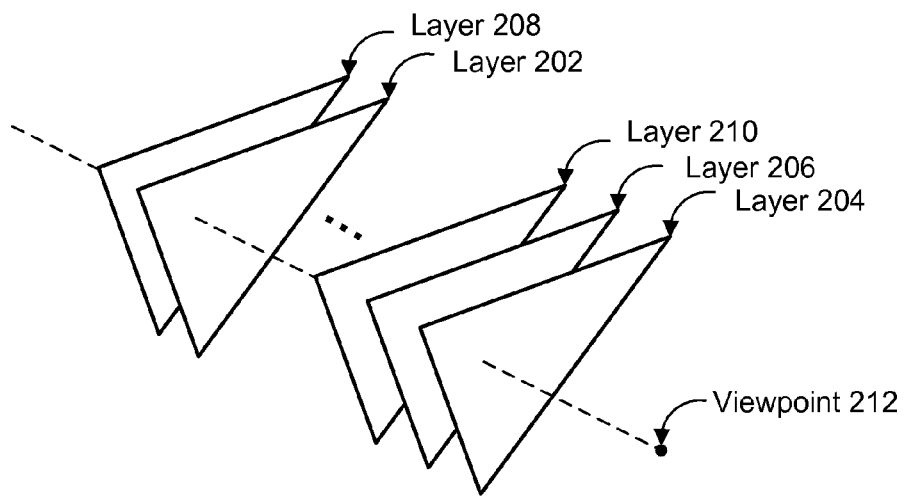
FIG. 2A is a diagram illustrating a depth order of layers in an image that is configured to be rendered with a depth of field blur using embodiments of the systems and methods described herein.

FIG. 2A is a diagram illustrating a depth order of layers in an image that is configured to be rendered with a depth of field blur using embodiments of the systems and methods described herein. A plurality of different layers 202, 204, 206, 208, and 210 are illustrated in a depth order reflecting their relative distance from the viewpoint 212. In the example shown in FIG. 2A, surface 208 is the furthest surface, and surface 204 is the nearest surface. The shapes and positions of the layers 202, 204, 206, 208, and 210 may vary from the example shown in FIG. 2A. Each of the layers 202, 204, 206, 208, and 210 may include one or more objects. Each object may be a polygon comprising a plurality of vertices, and each object and/or vertex may be associated with additional data such as textured-mapped color and/or transparency information. In one embodiment, all of the vertices of a particular object are located within the plane of a particular layer. In one embodiment, vertices of objects in the layers 202, 204, 206, 208, and 210 may have associated depth values (i.e., Z values) indicating relative depth or distance from the viewpoint 212. The depth values may be bounded by a "Z-far" value and a "Z-near" value to ensure that the depth values of the objects are within a known finite range. An object in a particular layer may partially or completely block objects in layers further away from the viewpoint 212, depending upon the transparency properties of the object. The viewpoint 212 may be associated with a virtual camera lens such as a pinhole camera.

Figure 2B:
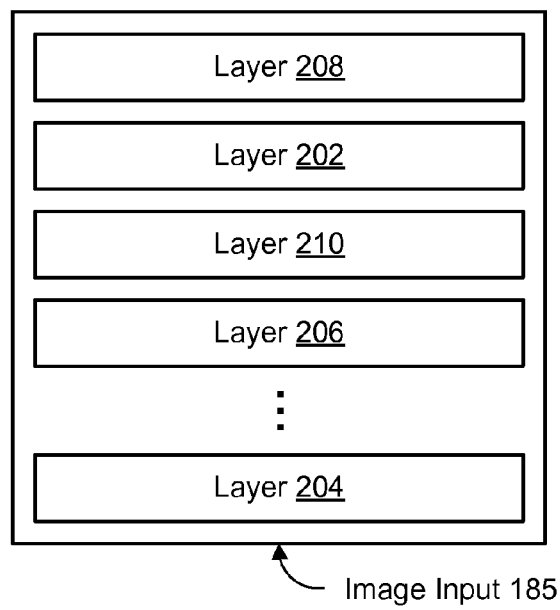
FIG. 2B is a diagram illustrating a draw order of layers in an image that is configured to be rendered with a depth of field blur using embodiments of the systems and methods described herein.

FIG. 2B is a diagram illustrating a draw order of layers in an image that is configured to be rendered with a depth of field blur using embodiments of the systems and methods described herein. In one embodiment, the GPU 100 may be configured to render objects in draw order, i.e., the order in which the associated layers are received at the GPU 100. In one embodiment, the layers illustrated in FIG. 2A may be sorted in depth order prior to sending the objects to the GPU 100. When provided as image input 185 to the GPU 100, the objects in the layers 202, 204, 206, 208, and 210 may thus be provided in an order that is the same as the depth order illustrated in FIG. 2A. The objects and/or layers 202, 204, 206, 208, and 210 may be sorted by depth using any appropriate algorithm. In one embodiment, the objects and/or layers 202, 204, 206, 208, and 210 may be sorted in depth in preparation for rendering according to the "painter's algorithm."

In one embodiment, each polygon in the scene (i.e., each object in the image input 185) may be blurred to simulate a depth of field effect as the scene is rendered. Each polygon may be blurred via a convolution whose kernel size is a function of the distance of the polygon or layer from the camera. The blurred rendered polygon may then be composited into the final scene. The depth of field simulation may include modeling a pinhole camera, and the pinhole camera may be associated with the attributes of focal length and aperture to approximate the depth of field blur. In one embodiment, suitable application programming interfaces (APIs) (e.g., OpenGL APIs) may be used to program the vertex shader and/or fragment shader of the GPU 100 to perform aspects of the depth of field simulation on the GPU. By implementing the depth of field simulation on the GPU 100, a substantial acceleration of the depth of field simulation may be achieved in comparison to depth of field simulation techniques on a CPU.

Figure 3:
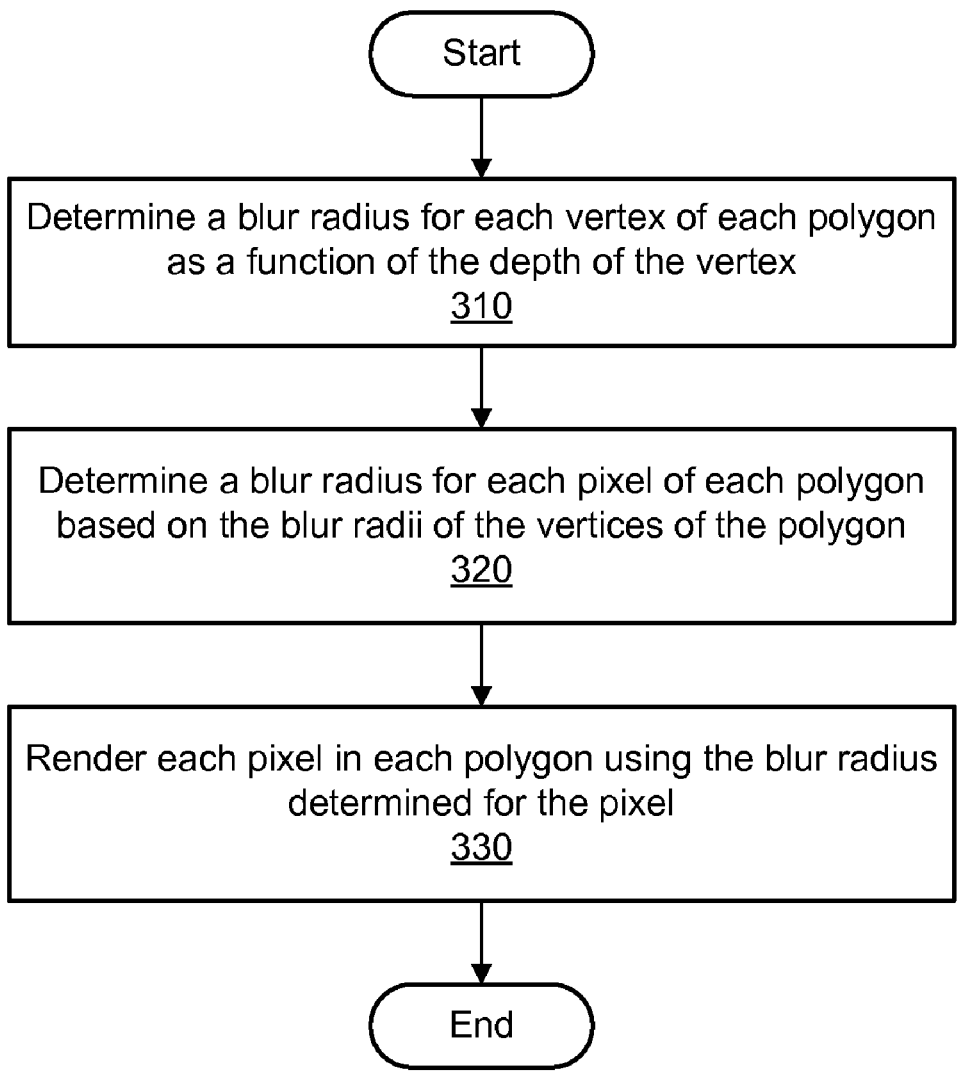
FIG. 3 is a flow diagram illustrating a method for rendering a scene with a depth of field blur according to one embodiment.

FIG. 3 is a flow diagram illustrating a method for rendering a three-dimensional scene with a simulated depth of field blur according to one embodiment. The scene may comprise a plurality of polygons, each polygon may comprise a respective plurality of vertices, and each of the vertices may have a respective depth value As shown in block 310, a blur radius may be determined for each vertex of each polygon as a function of the depth of the vertex. As shown in block 320, a blur radius may be determined for each pixel in each polygon based on the blur radii for the vertices of the polygon. In one embodiment, the blur radius may be determined for each pixel through interpolation of the blur radii of the vertices of the polygon. As shown in block 330, each pixel in each polygon may be rendered using the respective blur radius determined for the pixel. The rendered scene may then be displayed on a display device. Further aspects of the operations shown in blocks 310, 320, and 330 are discussed below.

Figure 4:
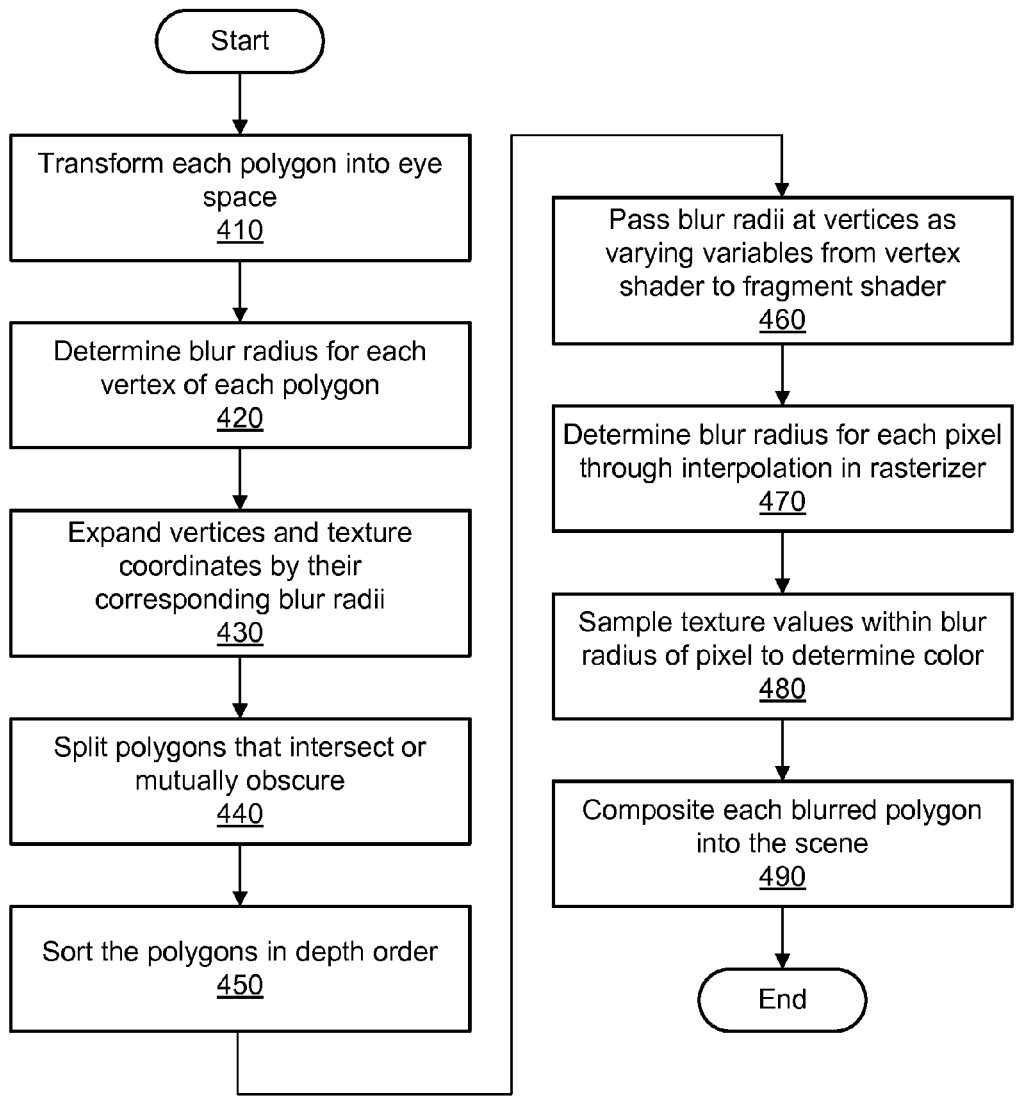
FIG. 4 is a flow diagram illustrating a method for rendering a scene with a depth of field blur using a GPU according to one embodiment.

FIG. 4 is a flow diagram illustrating further aspects of a method for rendering a three-dimensional scene with a depth of field blur using a GPU according to one embodiment. As shown in block 410, the polygon may be transformed into eye space. As shown in block 420, the blur radius for the depth of field effect may be calculated at each vertex of each polygon The blur radius for each vertex may be calculated using any suitable method. Typically, the blur radius may vary hyperbolically as a function of the distance of the vertex from the viewpoint 212 or virtual camera lens. In one embodiment, the blur radius may be calculated as follows:

$$coeff = \frac{camera\_aperture * lens\_focal\_legnth * focus\_distance}{focus\_distance - lens\_focal\_legnth}$$

$$blur\_radius = coeff * \left(\frac{1.0}{depth\_of\_vertex} - \frac{1.0}{focus\_distance}\right)$$

The parameter focus distance is the distance (e.g., in pixels) from the camera that is in focus. The parameter lens focal length is the focal length (e.g., in pixels) of the simulated camera lens. The parameter camera aperture is the width (e.g., in pixels) of the camera's aperture. The parameter depth of vertex is the distance (e.g., in pixels) of the vertex from the camera. If the camera parameters are converted to pixels from their typical expression in terms of inches or centimeters, a conversion factor of 72 pixels per inch may be used.

As shown in block 430, each polygon and its associated texture coordinates may be expanded by the blur radius. Each vertex may be moved away from the centroid of the polygon by an amount equal to the blur radius for the vertex. In this manner, the polygon may be expanded non-uniformly to accommodate a spatially varying blur. To move each vertex outward by its associated blur radius, the blur radius may be added to a radial vector extending from the center of the polygon to the original vertex. In one embodiment, this technique may be applied to polygons that are star convex (e.g., rectangles and triangles). The texture coordinates of the expanded vertices may also be expanded, and the region outside the original polygon may be transparent black. The size of the polygon grows with the depth of field blur, and the edge of the polygon may be partially transparent after the expansion.

In one embodiment, the operations shown in blocks 420 and 430 may be performed on the host computer system (i.e., on the CPU). In another embodiment, the operations shown in blocks 420 and 430 may be performed through execution of the vertex shader 121 on the GPU 100.

As shown in block 440, any intersecting polygons and polygons that mutually obscure one another may be split in preparation for rendering according to the painter's algorithm. In one embodiment, intersecting polygons and polygons that mutually obscure one another may be split along the line of intersection after they have been expanded by their respective blur radii. The split polygons may be stored in a BSP-tree which can be traversed to produce a rendering order suitable for the painter's algorithm.

As shown in block 450, the split and un-split polygons may be sorted (thereby generating the image input 185 shown in FIG. 2B) in preparation for rendering according to the painter's algorithm. In one embodiment, the polygons may be sorted on the CPU before being sent to the GPU (e.g., as image input 185). Using the GPU 100, each polygon may be rendered into the scene based on the expanded vertices and blur radii as discussed in greater detail below.

As shown in block 460, the vertex shader 121 may accept a blur radius as a vertex attribute for each vertex and pass it as a varying variable to the fragment shader. In one embodiment, the blur radius passed as a vertex attribute may be slightly different than the one used to calculate the new vertex position because the calculated blur radius was for a vertex of the unexpanded polygon. However, the difference between the originally calculated blur radius and the recalculated blur radius may be small and inconsequential. The optional recalculation of the blur radii is discussed further with respect to FIG. 5.

As shown in block 470, the blur radius for each pixel in each polygon may be determined by interpolation of the blur radii at the vertices. Based on the blur radii at the vertices specified as varying variables, the GPU 100 may determine the blur radius for each pixel in the polygon by interpolation of the blur radii at the vertices. In one embodiment, this interpolation may be performed automatically in a rasterization step performed between execution of the vertex shader and execution of the fragment shader in the GPU 100. The rasterization step may be performed by a rasterizer 123 included in the GPU 100. Because the depth may vary across a polygon, the blur radius may vary across a polygon. The blur radius may thus be rasterized by the GPU 100 in a perspectively correct manner so that the blur effect will vary from pixel to pixel and so that the blur effect will be correct for the relative depth.

In rendering the scene with a simulated depth of field effect, each polygon in the image input 185 may be rendered. In the fragment shader, each polygon may be composited into the scene as the depth of field blur is applied to the pixels in the polygon. As discussed above, the painter's algorithm may be used so that the polygons are rendered in depth order from furthest to nearest. As shown in block 480, the fragment shader 122 may sample the texture values within the blur radius at each pixel to determine a color for the pixel. The fragment shader may determine a weighted average of the colors and alpha values within the blur radius. At each pixel to be rendered, the fragment shader may sample the associated texture within a circular sampling region centered at the pixel and having the same radius as the blur radius. The sampling may produce a color value for the pixel. The color value may be further modified by additional processing associated with lighting, motion blur, etc.

Any suitable technique may be used to sample the texture within the sampling region. In one embodiment, for example, all the texels (i.e., texture elements) within the sampling region may be averaged. The upper limit of the blur may be fixed to avoid large fragment programs when the GPU compiler unrolls the sampling loop. The texel averaging may be combined with a polygon antialiasing pass in which the color and transparency values are calculated as a weighted average of neighboring values. In another embodiment, a Poisson sampling pattern with a fixed number of samples may be used to sample the sampling region. The sampling points may be scaled to fit the sampling region. The size of the sampling radius may be estimated, and a sampling pattern based on the size may be supplied accordingly. In yet another embodiment, the sampling may be split into a horizontal sweep and a vertical sweep through the sampling region.

As shown in block 490, each blurred rendered polygon may be composited into the scene. Each polygon may be rendered with an appropriate depth of field blur into an image buffer 150. In one embodiment, each polygon may be rendered into an offscreen buffer, and then the blurred result in the offscreen buffer may be composited into the frame buffer.

Figure 5:
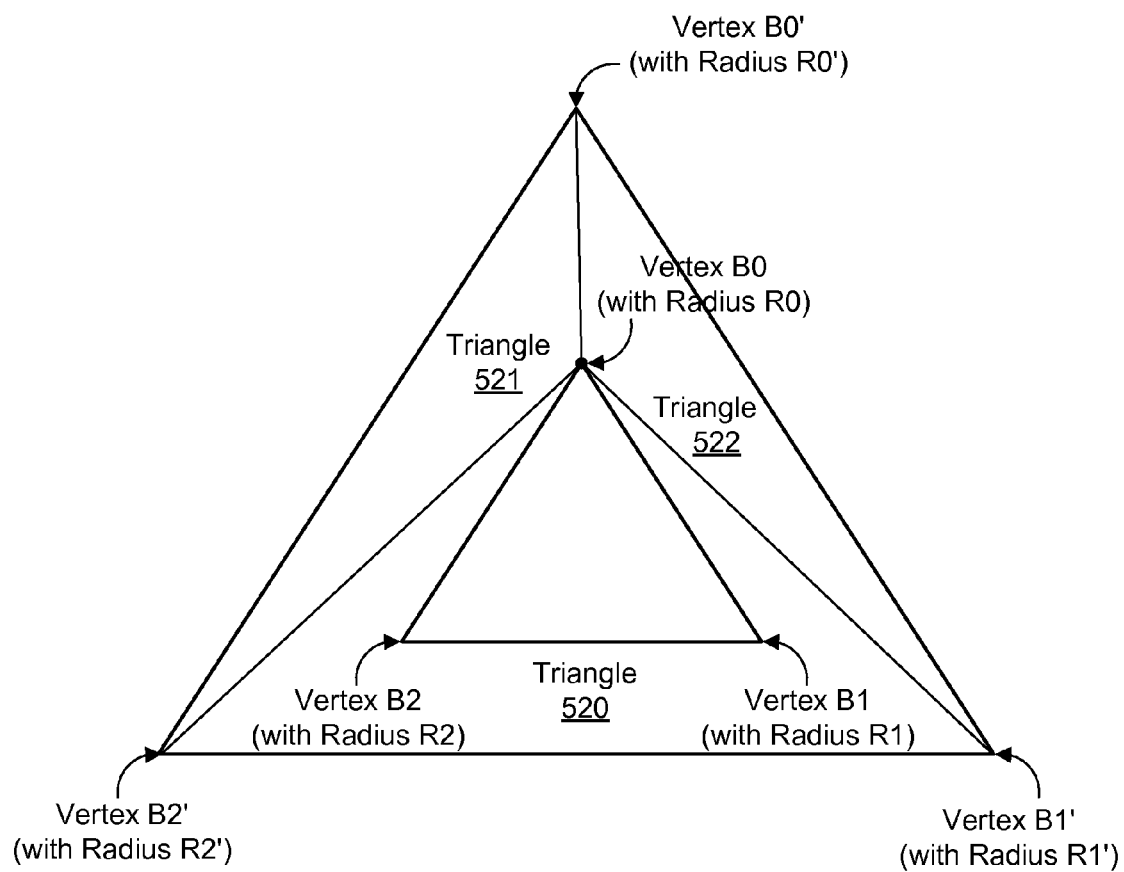
FIG. 5 is a diagram illustrating the expansion of a polygon by the blur radius of its vertices according to one embodiment.

FIG. 5 is a diagram illustrating the expansion of a polygon by the blur radius of its vertices according to one embodiment. The example polygon shown in FIG. 5 is a triangle. However, another type of polygon (e.g., a rectangle) may be processed in a similar manner (e.g., by decomposing it into triangles and assigning the appropriate texture coordinates to each vertex of the new triangle). The example triangle is defined by three vertices B0, B1, and B2 and respective blur radii R0, R1, and R2. The vertices of the expanded triangle are B0', B1', and B2'. The respective blur radii at the expanded vertices are R0', R1', and R2'.

In one embodiment, the blur radii R0', R1', and R2' at the expanded vertices may be copied from the respective original blur radii R0, R1, and R2. In another embodiment, the blur radii R0', R1', and R2' at the expanded vertices may instead be generated by re-calculating the blur radii. By calculating a new set of blur radii R0', R1', and R2' at the expanded vertices, the rasterizer 123 may assign the correct radius for the pixel representing a vertex of the original triangle. In one embodiment, the original triangle is always enclosed in the expanded triangle; therefore, each of its vertices has barycentric coordinates whose values lie between 0 and 1 with respect to the expanded vertices. Thus, each original vertex may comprise a weighted average of the expanded vertices, such that:

$$B0 = aB0' + bB1' + cB2'$$

$$B1 = dB0' + eB1' + fB2'$$

$$B2 = gB0' + hB1' + iB2'$$

The coefficients a, b, c, d, e, f, g, h, and i may be calculated from the ratio of areas of the barycentric triangles. For example, the coefficients of the vertex B0 may be related to the areas of the three triangles 520, 521, and 522 as follows:

$$a = (\text{area } B0, B1', B2') / (\text{area } B0', B1', B2')$$

$$b = (\text{area } B0, B2', B0') / (\text{area } B0', B1', B2')$$

$$c = (\text{area } B0, B0', B1') / (\text{area } B0', B1', B2')$$

The coefficients d, e, f, g, h, and i may be similarly determined. The blur radii R0', R1', and R2' for the expanded vertices may be obtained by solving the following system of linear equations:

$$R0 = aR0' + bR1' + cR2'$$

$$R1 = dR0' + eR1' + fR2'$$

$$R2 = gR0' + hR1' + iR2'$$

FIG. 6 is a diagram illustrating constituent elements of a computer system 900 that is configured to implement embodiments of the system and method for simulating a depth of field effect. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s)

910. The graphics component 956 may include a GPU such as the GPU 100 illustrated in FIG. 1. Additionally, the computer system 900 may include one or more imaging devices 952. The one or more imaging devices 952 may include various types of raster-based imaging devices such as monitors and printers. In one embodiment, the one or more imaging devices 952 may comprise one or more display devices 952 that are coupled to the graphics component 956 for display of data provided by the graphics component 956.

In one embodiment, program instructions 940 that may be executable by the processor(s) 910 to implement aspects of the rendering and depth of field simulation techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 6, as illustrated by the ellipsis shown.

In various embodiments, the elements shown in FIGS. 3 and 4 may be performed in a different order than the illustrated order. In FIGS. 3 and 4, any of the operations described in the elements may be performed programmatically (i.e., by a computer according to a computer program). In FIGS. 3 and 4, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method for rendering a three-dimensional scene with a simulated depth of field blur, wherein the scene comprises a plurality of polygons, wherein each polygon comprises a respective plurality of vertices, wherein each of the vertices has a respective depth, the method comprising:
performing, by a computer system:
determining a respective blur radius for each vertex of each polygon as a function of the depth of the vertex;
determining a respective blur radius for each pixel in each polygon based on the blur radii for the vertices of the polygon; and
rendering each pixel in each polygon using the respective blur radius determined for the pixel.

2. The method as recited in claim 1, wherein determining the respective blur radius for each pixel in each polygon based on the blur radii for the vertices of the polygon comprises interpolating between the blur radii for the vertices of the polygon using a rasterizer of a graphics processing unit (GPU).

3. The method as recited in claim 1, further comprising:
expanding each vertex of each polygon from a center of the polygon by the respective blur radius of the vertex; and
expanding each texture coordinate for each vertex of each polygon from the center of the polygon by the respective blur radius of the vertex.

4. The method as recited in claim 3, further comprising:
determining a respective blur radius for each expanded vertex of each polygon.

5. The method as recited in claim 1, wherein rendering each pixel in each polygon using the respective blur radius determined for the pixel comprises:
sampling texture values within the respective blur radius determined for the pixel; and
averaging the sampled texture values.

6. The method as recited in claim 1, further comprising:
sorting the plurality of polygons in depth order prior to rendering each pixel in each polygon.

7. The method as recited in claim 1, further comprising:
displaying the rendered scene on a display device.

8. A computer-readable storage medium, comprising program instructions for rendering a three-dimensional scene with a simulated depth of field blur, wherein the scene comprises a plurality of polygons, wherein each polygon comprises a respective plurality of vertices, wherein each of the vertices has a respective depth, wherein the program instructions are computer-executable to implement:
determining a respective blur radius for each vertex of each polygon as a function of the depth of the vertex;
determining a respective blur radius for each pixel in each polygon; and
rendering each pixel in each polygon using a respective blur radius determined for the pixel based on the blur radii for the vertices of the polygon.

9. The computer-readable storage medium as recited in claim 8, wherein determining the respective blur radius for each pixel in each polygon based on the blur radii for the vertices of the polygon comprises interpolating between the blur radii for the vertices of the polygon using a rasterizer of a graphics processing unit (GPU).

10. The computer-readable storage medium as recited in claim 8, wherein the program instructions are computer-executable to implement:
expanding each vertex of each polygon from a center of the polygon by the respective blur radius of the vertex; and
expanding each texture coordinate for each vertex of each polygon from the center of the polygon by the respective blur radius of the vertex.

11. The computer-readable storage medium as recited in claim 10, wherein the program instructions are computer-executable to implement:
determining a respective blur radius for each expanded vertex of each polygon.

12. The computer-readable storage medium as recited in claim 8, wherein rendering each pixel in each polygon using the respective blur radius determined for the pixel comprises:

sampling texture values within the respective blur radius determined for the pixel; and averaging the sampled texture values.

13. The computer-readable storage medium as recited in claim 8, wherein the program instructions are computer-executable to implement:

sorting the plurality of polygons in depth order prior to rendering each pixel in each polygon.

14. A system for rendering a three-dimensional scene with a simulated depth of field blur, the system comprising:

a graphics processing unit (GPU); and a memory coupled to the GPU, wherein the memory stores a plurality of polygons, wherein each polygon comprises a respective plurality of vertices, wherein each of the vertices has a respective depth; and wherein the GPU is executable to:

determine a respective blur radius for each vertex of each polygon as a function of the depth of the vertex;

determine a respective blur radius for each pixel in each polygon based on the blur radii for the vertices of the polygon; and render each pixel in each polygon using the respective blur radius determined for the pixel.

15. The system as recited in claim 14, wherein, in determining the respective blur radius for each pixel in each polygon based on the blur radii for the vertices of the polygon, the GPU is executable to interpolate between the blur radii for the vertices of the polygon.

16. The system as recited in claim 14, wherein the GPU is further executable to:

expand each vertex of each polygon from a center of the polygon by the respective blur radius of the vertex; and expand each texture coordinate for each vertex of each polygon from the center of the polygon by the respective blur radius of the vertex.

17. The system as recited in claim 16, wherein the GPU is further executable to:

determine a respective blur radius for each expanded vertex of each polygon.

18. The system as recited in claim 14, wherein, in rendering each pixel in each polygon using the respective blur radius determined for the pixel, the GPU is executable to:

sample texture values within the respective blur radius determined for the pixel; and average the sampled texture values.

19. The system as recited in claim 14, further comprising:

a central processing unit (CPU);

an additional memory coupled to the CPU, wherein the additional memory is configured to store program instructions, wherein the program instructions are executable by the CPU to:

sort the plurality of polygons in depth order; and send the sorted polygons to the GPU.

* * * * *